(12) United States Patent
Dalal et al.

(10) Patent No.: US 8,674,989 B1
(45) Date of Patent: Mar. 18, 2014

(54) SYSTEM AND METHOD FOR RENDERING PHOTOREALISTIC IMAGES OF CLOTHING AND APPAREL

(75) Inventors: Navneet Dalal, Foster City, CA (US); Salih Burak Gokturk, Palo Alto, CA (US); Lorant Toth, San Francisco, CA (US); Tianli Yu, San Mateo, CA (US)

(73) Assignee: Google Inc., Mountain View, CA (US)

( * ) Notice: Subject to any disclaimer, the term of this patent is extended or adjusted under 35 U.S.C. 154(b) by 539 days.

(21) Appl. No.: 12/972,347

(22) Filed: Dec. 17, 2010

Related U.S. Application Data

(60) Provisional application No. 61/287,701, filed on Dec. 17, 2009.

(51) Int. Cl.
*G06T 15/60* (2006.01)

(52) U.S. Cl.
USPC ............ 345/426; 345/419; 345/420; 345/473

(58) Field of Classification Search
USPC ................. 345/419, 426, 473, 420; 2/69, 409
See application file for complete search history.

(56) References Cited

U.S. PATENT DOCUMENTS

| | | | |
|---|---|---|---|
| 6,310,627 B1 * | 10/2001 | Sakaguchi | 345/630 |
| 6,907,310 B2 * | 6/2005 | Gardner et al. | 700/132 |
| 7,039,486 B2 * | 5/2006 | Wang | 700/117 |
| 7,149,665 B2 * | 12/2006 | Feld et al. | 703/2 |
| 7,386,429 B1 * | 6/2008 | Fujisaki | 703/6 |
| 7,479,956 B2 * | 1/2009 | Shaw-Weeks | 345/419 |
| 8,208,722 B1 * | 6/2012 | Wolfram | 382/167 |
| 2005/0234782 A1 * | 10/2005 | Schackne et al. | 705/27 |
| 2009/0116698 A1 * | 5/2009 | Zhang et al. | 382/111 |
| 2009/0193675 A1 * | 8/2009 | Sieber | 33/759 |
| 2010/0111370 A1 * | 5/2010 | Black et al. | 382/111 |
| 2010/0306082 A1 * | 12/2010 | Wolper et al. | 705/27 |

* cited by examiner

*Primary Examiner* — Kimbinh T Nguyen
(74) *Attorney, Agent, or Firm* — Mahamedi Paradice Kreisman LLP; Van Mahamedi (57) ABSTRACT

Embodiments described herein enable a user to select a set of clothing or apparel. The selected set of clothing or apparel is rendered to appear as being worn, by rendering one or more regions of the selected set to appear pinched or shaded.

22 Claims, 5 Drawing Sheets

SYSTEM AND METHOD FOR RENDERING PHOTOREALISTIC IMAGES OF CLOTHING AND APPAREL

RELATED APPLICATIONS

This application claims benefit of priority to Provisional U.S. Patent Application No. 61/287,701, filed Dec. 17, 2009; the aforementioned application being hereby incorporated by reference in its entirety.

TECHNICAL FIELD

Embodiments described here relate generally to a system and method for rendering photorealistic images of clothing and apparel.

BACKGROUND

Imaging technology combined with computer processing capabilities enables photorealistic imaging that enables image modification and simulation.

DETAILED DESCRIPTION

Photorealistic imaging refers to a computer-implemented process in which actual images of different objects are assimilated and combined to render a new image. In the context of clothing and apparel, photorealistic imaging involves enabling users (operators on a computer) to select clothing and apparel, and presenting an assimilated image of the selected clothing and apparel to appear worn. Among other enhancements, embodiments depict pinching or shading to make clothing/apparel appear as though it would when worn by a person.

According to an embodiment, the clothing and apparel selected by the user is rendered in a manner that (i) recreates what the clothing actually looks like, while (ii) simulating real-life effects of how the clothes appear when worn. In particular, embodiments described herein take into consideration the pose or clothing environment (e.g. what other clothes are to be worn at the same time) that is being depicted with the images. Among considerations of real-life effects, some embodiments recognize the need to use computer-implemented processes to render shading or lighting characteristics that add a dimension of realism to the assimilated image. Additionally, some embodiments implement computer-implemented processes to account for pinching or crimping effects when clothing is worn on a person, or under some other item (e.g. when baggy clothing is pinched by a belt).

Embodiments described herein enable a user to select a set of clothing or apparel. The selected set of clothing or apparel is rendered to appear as being worn, by rendering one or more regions of the selected set to appear pinched or shaded. The pinching or shading enhances the realism of rendering the clothing or apparel in the worn state.

In some embodiments, the clothing or apparel is rendered to appear cast on a model or mannequin. The user can thus select clothing or apparel to dress a model or mannequin. The clothing or apparel may include pinching or shading to account for presence of other items of clothing/apparel, or of the person (as represented by the model or mannequin). As an alternative, the clothing or apparel may be imaged to appear worn, without an underlying model or mannequin. For example, clothing in a worn state may be superimposed on another type of object, or made to appear hanging on a hangar, or presented on an invisible or alternative form.

Still further, some embodiments programmatically determine where pinched and shaded regions are to be appear on an item of clothing or apparel, given the relative position of, for example, another item of clothing/apparel that is being worn at the same time.

The term "worn" is used as the past participle of the "wear".

Among considerations, some embodiments provide that the model is imaged from a person or mannequin. The model is used to establish a standard in pose and dimension.

In one embodiment, an image of a model is presented to a user. The user is enabled to select a set of clothing or apparel that is worn by the model. The set of clothing or apparel is then rendered on the model for the user. In rendering the clothing on the model, a region of one of the selected item or clothing or apparel is pinched or shaded based on (i) a relative position of another item of clothing or apparel in the selected set, and/or (ii) a portion of the model.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation system provided for in this application may require use of memory, processors and network resources (including data ports, and signal lines (optical, electrical etc.)), unless stated otherwise.

Embodiments described herein generally require the use of computers, including processing and memory resources. For example, systems described herein may be implemented on a server or network service. Such servers may connect and be used by users over networks such as the Internet, or by a combination of networks, such as cellular networks and the Internet. Alternatively, one or more embodiments described herein may be implemented locally, in whole or in part, on computing machines such as desktops, cellular phones, personal digital assistants or laptop computers. Thus, memory, processing and network resources may all be used in connection with the establishment, use or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor (s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

Figure 1:
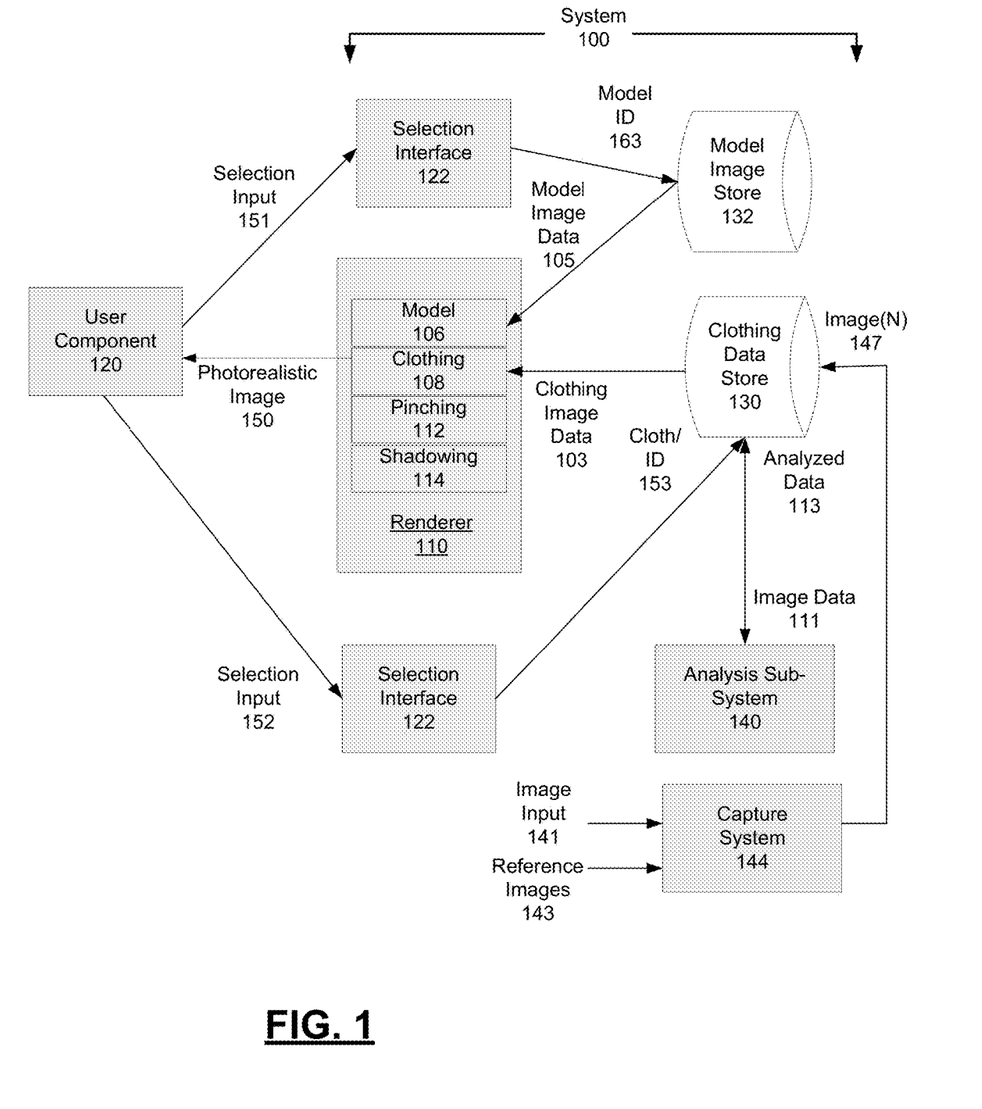
FIG. 1 illustrates a system for rendering photorealistic images of clothing and apparel as being worn, according to one or more embodiments.

FIG. 1 illustrates a system for rendering photorealistic images of clothing and apparel as being worn, according to one or more embodiments. A system 100 may be implemented on a computing environment, such as one or more servers that provide the functionality of the system through a website or web interface. A user may operate a terminal to access functionality provided by system 100 over a network such as the Internet. The user terminal may correspond to a personal computer, laptop, tablet, or mobile computing device that is network connected. The terminal may operate in applications such as a web browser or web-enabled application, to access the functionality provided by system 100. Alternative embodiments provide for system 100 to be implemented on user terminals, or distributed between user terminal and server.

The system includes a renderer 110 and a selection interface 122. The renderer 110 may generate photorealistic images 150 for displaying clothing and apparel as being worn (or in a worn state). In one embodiment, the clothing/apparel images are superimposed or cast onto a virtual model or mannequin. Other environments and forms may also be used to depict the clothing or apparel as being worn. In one embodiment, virtualized models are depicted as wearing selected items of clothing and/or apparel, using preprocessing images that are maintained in one or more data stores (clothing data store 130 and model image store 132). According to one or more embodiments, renderer 110 includes different functional components, including a model presentation component 106, a clothing presentation component 108, pinching effects 112, and shadowing effects 114.

A user component 120 operates on the user's terminal to access the renderer 110 over a network. When the user's terminal component 120 accesses the renderer 110 (e.g. on website), the renderer 110 generates an initial presentation that enables the user to view (or search) an initial selection of clothing and apparel. For example, the renderer 110 may have a default presentation depicting models wearing clothing and/ or apparel, based on the pre-determined clothing/apparel selection. The user may then have access to menus, search operations, and various other input interfaces for purpose of enabling the user to select items of clothing and/or apparel. Alternative initial presentations are also possible. For example, the user may see displayed images from a catalog of clothing and/or apparel, without the use of models. Furthermore, the initial presentation can be provided under various environments, such as in the form of supplemental content or application content. Numerous such variations are possible.

According to some embodiments, the website or service provides a catalog of clothing and apparel from which the user can make selections. The catalog may be comprised of images, as well as other content such as text, which describe individual items of clothing or apparel. Such clothing items/ apparel can be made available for purchase or viewing to the user. In order to present images of the individual items of clothing/apparel of the catalog in a manner that can be cast onto a model, a capture system 144 is used to capture images of the real-life items as worn by a model or mannequin. As described in greater detail below, the capture system 144 may include cameras and positioning equipment that precisely positions mannequins or human models in a reference platform. The models (human or mannequin) may be photographed with items from the clothing cast on the models. In one implementation, all items from the catalog are photographed on the models. In another implementation, a representative set of images is photographed. The capture system 144 may utilize positioning equipment to precisely position cameras in the same position from one shot to the next. The capture system may also utilize laser sights, fixed tripods and calibration equipment in order to ensure the same reference frame is repeated as needed. In addition, the capture system 144 normalizes the lighting based on reference images 143 and other input 141 in order to accommodate changes in lighting that result from variations in the bulbs or from environmental factors. The normalized images of the clothing/ apparel items are captured, as worn by real-life models. The images 147, as normalized to lighting and position, are stored in the clothing data store 130. Once the images are captured, they can subsequently be selected and rendered on virtual depictions of the models. The rendering of the clothing on the virtual model, however, may lack realism, or be completely non-functional if shading and crimping are not accommodated when the clothing/apparel images are cast onto the virtual model.

The selection interface 122 may detect and handle the user's selection input 152 which specifies clothing and/or apparel that the user wishes to see worn by a model. Optionally, the user may also provide model selection input 151, corresponding to a selection of a particular virtualized model, based on preferences such as hair color, skin tone or race. The selection interface 122 identifies clothing 153 from the clothing data store 130. Clothing image data 103 is communicated to the renderer 110, having clothing presentation component 108 which can cast or superimpose the image of the clothing on the virtualized model in use. The selection interface 122 may also identify a model 163 from the model image store 132. Model image data 105, corresponding to the selected model as specified by the user, may be incorporated by the model presentation component 106. The renderer 110 uses the clothing presentation component 108 and the model presentation component 106 to generate a photorealistic image of the selected model, wearing the selected set of clothing and/or apparel, as specified by the user. The model presentation component 106 may render virtualized models or mannequins for use in displaying clothes/apparel in the worn state. However, other forms or objects, as well mediums for depicting clothing/apparel in the worn state may be implemented (e.g. clothes hanging from object).

Embodiments described herein recognize the need for enabling users to select clothing ensembles, or sets of clothing and/or apparel. Still further, embodiments recognize that in real-life appearance, different pieces of clothing in an ensemble or set may have different boundaries and have their appearance affected by the presence of other clothing, or even by the presence of the person wearing the item. To accommodate such real-life parameters, the renderer 110 implements pinching and shadowing algorithms to adjust appearance of selected items of clothing and apparel based on the relative position of (i) other selected items of clothing, (ii) or of the simulated person wearing the selected clothing. These real-life parameters may be depicted by altering or modifying the depiction of the items of clothing and apparel to reflect pinching, cramping, and/or shadowing. Such effects add realism to the depiction of the virtual model wearing the selected items of clothing.

According to some embodiments, the clothing/apparel and model images are used to create the photorealistic images 150 are pre-processed to identify boundaries and other parameters reflecting physical presence of clothing and/or persons wearing clothing. In one embodiment, an analysis subsystem (analysis sub-system 140) performs analysis operations on the captured images 147 of clothing and apparel, as well as on images of models (also normalized), in order to identify various parameters used in implementing superimposition of the various images, as well as their pinching and/or shadowing effects. The analysis sub-system 140 may determine the boundaries of the respective items of clothing or apparel, when simulated as being worn on a model. In one embodiment, real-life models are imaged, according to a specific reference frame, wearing various items of clothing and apparel that are representative of the various depicted clothing/apparel provided in the clothing data store 130. In this way, the analysis sub-system 140 is able to use as input parameters, actual measurements from, for example, a photo studio in which the reference parameters are precisely maintained, and images of models wearing clothing are replicated repeatedly for various sets of clothing. By determining the boundaries of a representative set of images, some embodiments provide that the analysis sub-system 140 is able to preprocess other items of clothing and/or apparel in the clothing data store 130.

In addition, the analysis sub-system 140 may process images 111 stored in the data store 130 to identify visual features, such as color, pattern, texture, shape or style. The visual characteristics may be determined programmatically (e.g. using image recognition and/or text/meta data analysis) or manually, and then stored as analyzed data 113 for subsequent use. The use of image recognition and text/metadata processing to specify user's desired visual characteristics in items of clothing is described in, for example, U.S. patent application Ser. No. 12/431,706; which is incorporated by reference herein in its entirety. Thus, the analysis sub-system 140 may process image data 111 for individual items of clothing/apparel, identify visual characteristics present in such images (color, pattern, texture, shape), as well as the dimensional parameters (including those used to determine shape and boundaries) in providing analyzed data 113 for the item of clothing/apparel.

When the user makes clothing selection 153, the clothing presentation component 108 obtains dimensional parameters of the selected item of clothing with the clothing image data 103. The pinching component 112 may utilize such data, as well as model image data 105 (including dimensional data for a selected model), to implement one or more pinching algorithms that pinch or shade regions of clothing based on the presence of other items of clothing and or other real-life effects. Similarly, the shadowing component 114 utilizes the image data 111, and model image data 105, to determine shadow regions on the image of the model wearing the selected items of clothing/apparel. As described with an embodiment of FIG. 5 and FIG. 6, the shadowing component 114 may also utilize pre-determined shadowing information for specific models, poses, and items of clothing. Such predetermined shadow information reflects masks or patterns of light formed on a model as a result of the stance or pose of the model, as well as of the clothing worn by the model.

The result of the user selection of clothing/apparel and model is the generation of the photorealistic image 150. As a result of pinching and shadowing processes performed by the renderer 110, the photorealistic image 150 carries various real-life effects that enable the photorealistic image to appear more real.

Figure 2:
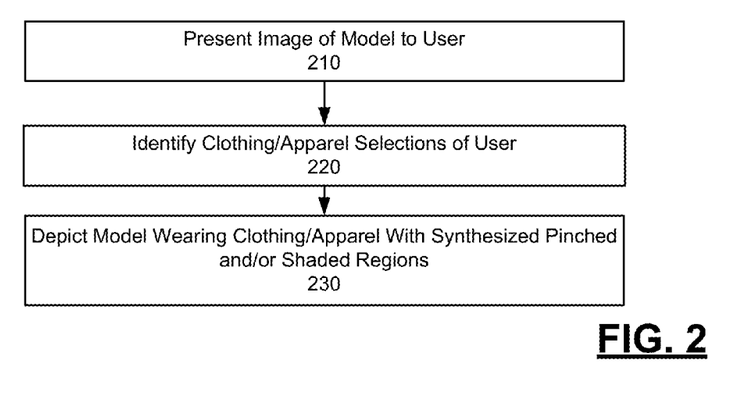
FIG. 2 illustrates a method for depicting a photorealistic image of a model wearing clothing or apparel, with added effects for pinching or shadowing, according to one or more embodiments.

FIG. 2 illustrates a method for depicting a photorealistic image of a model wearing clothing or apparel, with added effects for pinching or shadowing, according to one or more embodiments. In describing various methods described herein (see also FIG. 3 and FIG. 5), reference may be made to components described with the system of FIG. 1 for purpose of illustrating suitable components for performing a step or sub-step being described.

According to an embodiment, an image of the model is presented to a user. The model image may be captured in a manner that is in accordance with an established reference frame (210). The reference frame may include the positioning of the camera or lens at the time of capture along X, Y, Z axes, as well as with reference to pose and lighting. The reference frame may thus capture the various parameters and dimensions to enable subsequent normalize nation, comparison, and replication of image capturing. With reference to FIG. 1, capture system 144 may implement the reference system in capturing the images of the models and clothing.

In some implementations, a mannequin is used as a base, and the model image is superimposed on the mannequin to create a normalized reference image.

A user may select items of clothing and apparel (220). According to some embodiments, the individual items of clothing and apparel are imaged and pre-processed. The pre-processing may involve casting actual clothing and apparel (corresponding to those depicted in images) on a model or mannequin in a specific pose and in accordance with a specific reference frame (e.g. see 210), then imaging that item of clothing in the worn state. Not all of the items of clothing and apparel need to be imaged. Rather, some items of clothing/apparel may be representative of other clothing and apparel.

The selected items of clothing and apparel are then imaged on the presented model, with synthesized depictions of real-life effects such as pinching and shading (230). One or more embodiments provide that the image of the clothing/apparel on the model corresponds to the actual image taken of that item of clothing (or a representative item of clothing/apparel). The precision in the reference frame when the individual model and clothing images are captured enables substitution of models, as well as superimposition of various features. The synthesis of the pinching effect may be performed in accordance with pinching algorithms such as described with FIG. 3 and FIG. 4A-FIG. 4C. The synthesis of the shadowing effect may be performed in accordance with shadowy algorithms, such as described with FIG. 5 and FIG. 6.

Figure 3:
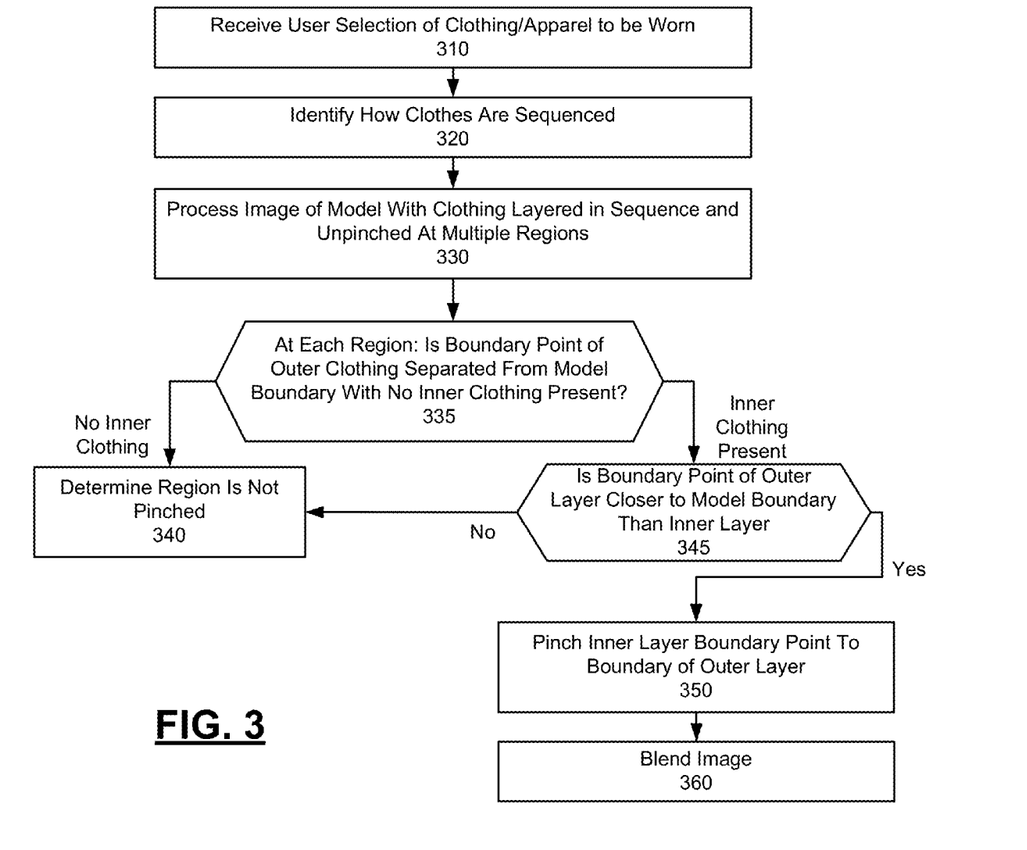
FIG. 3 illustrates a method for determining and depicting effects of pinching on a virtualized image of a model, according to one or more embodiments.

FIG. 3 illustrates a method for implementing determining and depicting effects of pinching on a virtualized image of a model, according to one or more embodiments. As mentioned, the user may select clothing/apparel that is to be worn by a virtual model or mannequin (310). The user selection may be made in accordance with the sequence, reflecting the user's intent for which item of clothing is to provide the respective outer and inner layer (320). In an embodiment, the sequence of the user's intent is identified (i.e. how the user wishes to layer the items of clothing). This may be performed simply by recording the order in which the user selects clothing to be worn on the model. For example, the user's first selection in time may reflect the user's desire for the inner garment layer, while the user's last selection in time may reflect the user's intent for the outer garment layer.

In an embodiment, the selected items of clothing are cast onto the virtual model without pinching of the desired user's layering. In this state, the clothed model has garments that occupied boundaries as if no other items of clothing are present. The pinching component 112 maintains information to identify how the clothes are to be layered, but the layering is not reflected in the model at that state. The model and unpinched state is processed at multiple regions to identify visual layering and pinching (330). For example, an ensemble may be processed at the model's shoulders, armpits, chest, and waist to determine the visual appearance of the clothes and the layered stage, as determined by the layering sequence of the user.

For each region, a determination is made as to whether the boundary point of the outer clothing, as identified by the users sequence or layering input, is separated from the model boundary with no inner clothing present (335). On a pixilated basis, this determination may be made by identifying a point or region on the outer clothing (as identified by the user sequence input), and processing pixel data inward towards the model along a normalized path. If this pixilated path is not interrupted by another garment, then the determination is that no inner clothing is present at that particular region or point. Thus, the determination is made that the particular region is not pinched (340). For example, the user may select the model to wear a tank top under a long-sleeved shirt. At the neckline, the long-sleeved shirt may be separated from the boundary of the model without the tank top layer intervening.

If the determination of step 335 is that inner clothing is present, then another determination is made as to whether pinching conditions are present (350). More specifically, a determination is made as to whether the boundary point of an outer garment layer (as designated by user input) is closer to the model's boundary as compared to the inner garment layer. If the determination is negative (outer garment layer is further away from the model boundary than the inner garment layer), then the determination is that the particular region in question is not a pinched region (340). For example, in the long-sleeved shirt over tank top example recited above, at the shoulders of the model, the long-sleeved shirt is further away from the boundary of the model than the inner garment (the tank top).

However, if the determination is that the outer garment layer is closer to the model boundary than inner garment layer, then pinching is to take effect at that particular region. For example, in the example provided above, the user may designate the tank top is to be worn over the long-sleeved shirt (e.g. basketball jersey worn over a long undergarment). When the region is to be pinched, the inner garment layer (long sleeve shirt) is pinched to the outer layer of (tank top). This may coincide with the boundary of the inner garment layer being removed and/or blended against the boundary of the outer garment layer (360). The blending may be performed using any one of various blending algorithms. It is desirable to avoid sharp corners and unrealistic geometric formations that can result because of variances in the shape of clothing relative to the position of the model's body. Various blending algorithms or considerations may avoid such formations, resulting in the pinching having a more real-life effect. Furthermore, the blending accompanying the pinching effect may also incorporate shadowing, to further add realism. To blend in many cases, regions that are not otherwise identified as being pinched may be drawn inward towards the model, to create the gradual and tensiled effects of pinching in real-life.

Additionally, the pinching algorithm may be implemented in accordance with certain rules. Examples of rules that affect pinching determinations include: designating some classes of clothing or apparel as not pinchable (e.g. jackets and belts); and (ii) limiting the ability of some clothes to pinch (stiff parchments may pinch less, reflected in how the pinched parchment is depicted in the pinched state).

Additionally, some embodiments provide that the modeled image is pinched only on the model's façade that is viewable in the two-dimensional presentation. For example, in real-life, the area between a person's arm and waist may be pinched by the presence of a belt. However, in two-dimensional photorealistic imaging, only the front of the model may reflect pinching.

According to an embodiment, the pinching effect described with an embodiment of FIG. 3 is performed in real-time, in response to the user's selection. Thus, the user selection of one item of clothing in one ensemble may result in that item of clothing being pinched, while the user's selection of the same item of clothing in a different ensemble may result in no pinching, or even different pinching.

Figure 4A:
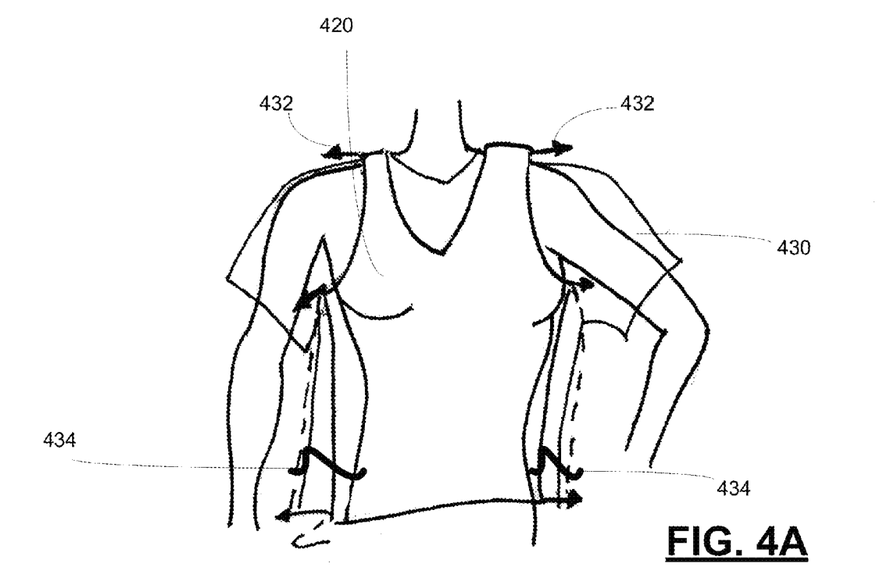
FIG. 4A illustrates an example of how pinching may be implemented in a photorealistic image, according to one or more embodiments.

FIG. 4A illustrates an example of how pinching may be implemented in a photorealistic image, according to one or more embodiments. Some embodiments provide that pinch regions are determined to coincide to areas where the clothing extends out from the model sufficiently to be drawn back in when another item is placed over it (e.g. belt). In the example shown by FIG. 4A, a shirt 420 is worn under a sleeveless sweater 430 that overlays the shirt 420, but exposes the sleeves and its surrounding shirt. In some embodiments, the pinch regions affect the item that is being covered, but only if the underlying clothing is pinchable. The shirt 420 becomes pinched, in that it is under the sweater, and has sleeves and surrounding area exposed. In one embodiment, an overlap region between the shirt 420 and the sweater 430 determine the pinch regions 432, 434. The overlap region is assumed to reduce the dimension of the shirt as it lays on the person (e.g. to bring the cloth against the person's skin). Where the shirt is exposed, the imaging considerations provide that the boundaries of the shirt are gradually returned to normal worn dimensions as the exposed region is distanced from the over-laying sweater. In one embodiment, the pinch effect is computed automatically by appropriate interpolation of the image regions which need to be pinched with those nearby regions which will not be pinched, so as to convey realism in the rendition.

Figure 4B:
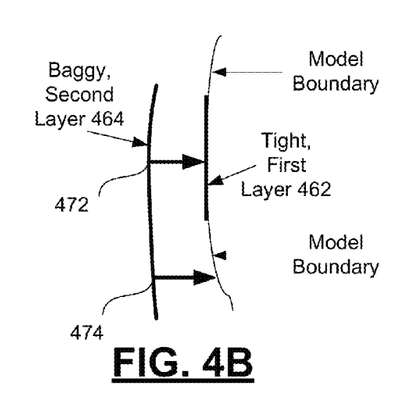
FIG. 4B and FIG. 4C illustrate examples of how pinching may be implemented, according to one or more embodiments.
Figure 4C:
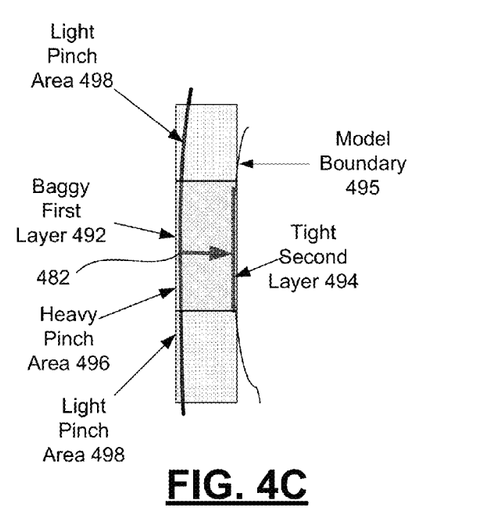

FIG. 4B and FIG. 4C illustrate examples of how pinching is implemented, according to one or more embodiments. In FIG. 4B, the user's sequence selection provides for a tight first (in time) garment layer 462 and a baggy second (in time) garment layer 464. The sequence dictates that the baggy garment layer is to be worn as the outer layer. A pinching algorithm such as described with an embodiment of FIG. 3 may process pixels starting at a region 472 of the second garment layer 464. In FIG. 4B, the inward pixel processing encounters the first garment layer 462. As the boundary of the outer/second garment layer is outside of the boundary of the inner/first garment layer (see e.g. step 345 of FIG. 3), the region 472 is determined to be an unpinched region (see e.g. step 340 of FIG. 3).

At region 474 of FIG. 4B, inward pixel processing encounters no other garment layer. For example, the outer second garment layer 464 may correspond to a blouse, while the inner garment layer 462 may correspond to a halter top that only partially covers the abdomen of the model. As described with steps 335 and 340 of FIG. 3, region 474 is determined to be an unpinched region, as no inner garment layer is present.

In the example shown by FIG. 4C, the user's sequence selection provides for a baggy first (in time) garment layer 492 and a tight second (in time) garment layer 494. The sequence dictates that the baggy garment layer 492 is to be worn as the inner layer. A pinching algorithm such as described with an embodiment of FIG. 3 may process pixels starting at a region 482 of the baggy first garment layer 492 and move inwards towards the model boundary 495. As the tighter second garment layer 494 is present, the determination may be made that pinching is to take effect. In one implementation, the pinching component 112 (see FIG. 1) alters the image of the baggy first garment layer 492, by removing or eliminating portions of that image to reflect pinching by the presence of the second (and outer) garment layer 494 (which is a tighter fit). The pinching of the alteration of the image of the first garment layer 492 may be blended to reflect heavy pinch area 496 adjacent to light pinch area for 498 (further away from the pinched area). Thus, the baggy inner garment layer 492 may be lightly pinched in regions adjacent to pinched regions, even when such regions would not otherwise be pinched (e.g. when the baggy inner garment layer 492 is not overlaid by the tighter outer garment layer 494).

Shading and Lighting Effect

Figure 5:
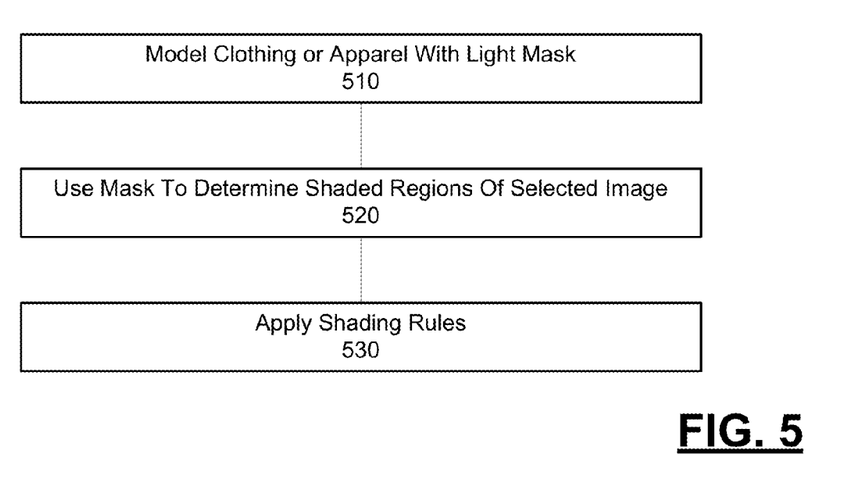
FIG. 5 illustrates a method for creating shading and lighting effects when implementing a photorealistic imaging system for depicting clothing and apparel, under an embodiment.

FIG. 5 illustrates a method for creating shading and lighting effects when implementing a photorealistic imaging system for depicting clothing and apparel, under an embodiment. As an initial process, clothing or apparel may be modeled for shadow creation (510). This step may include modeling clothing by category, or individually. In one embodiment, the clothing is modeled by (i) placing the clothing on a model or mannequin; (ii) illuminating the clothing from two opposite angles (other lighting alignments may also be used, particularly to simulate different kinds of lighting conditions); and (iii) making a light map.

Figure 6:
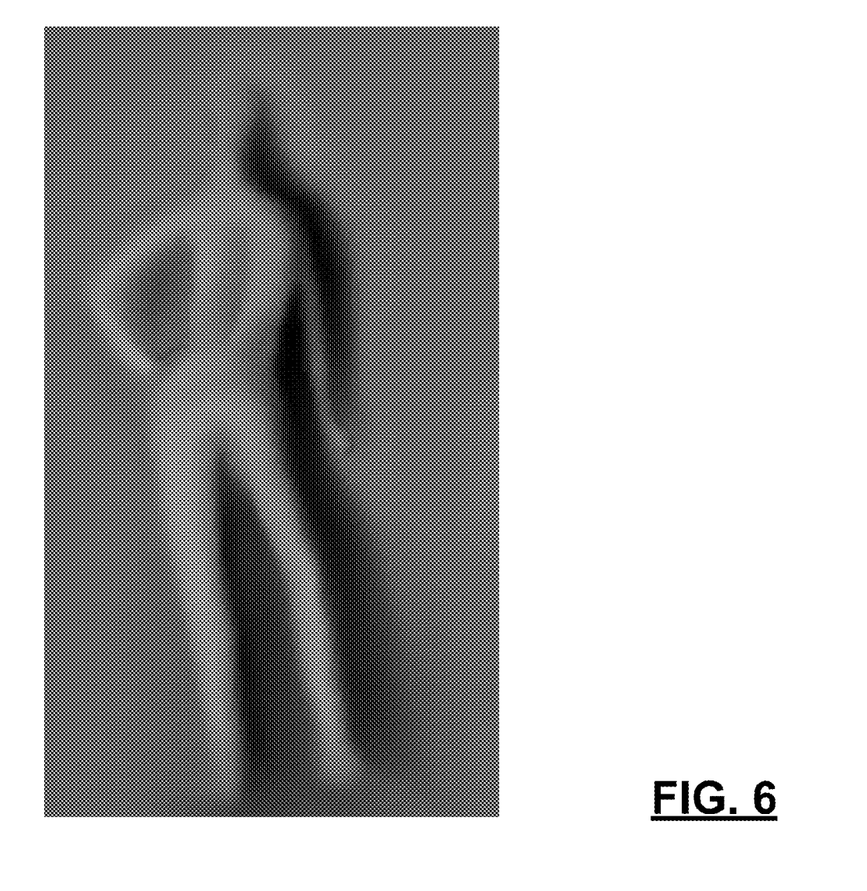
FIG. 6 illustrates an example of a light map that can made for an individual item of clothing, or an item of clothing that is representative of a class.

FIG. 6 illustrates an example of a light map that can be made for an individual item of clothing, or an item of clothing that is representative of a class. The light map provides a mask from which shaded regions can be identified when a corresponding item of clothing is selected and drawn on to the model. The computed light map may be manually edited to make it more realistic and to take care of corner cases.

With reference to (510), the mask may be used to determine shading regions for an item of clothing (520). When the user selects an image of a clothing item for display, some embodiments automatically determine shading by programmatically comparing the selected image on the reference model with the shading reference (i.e. the light mask, as shown by FIG. 5) for that same item.

As an addition or alternative, one or more shading rules may be implemented to render shading (530). Examples of shading rules include: (i) shade when there is pinching, or when one item of clothing is positioned over another; (ii) limit the extent of the shade depending on the object that is casting the shadow; (iii) darken pixels that are closest to the item creating shade; and (iv) smoothly transition darkened pixels to color of clothing to avoid sharpness. Certain rules may also apply to when the mask is used to identify shaded regions, such as to not shade the person's face.

Computer System

Figure 7:
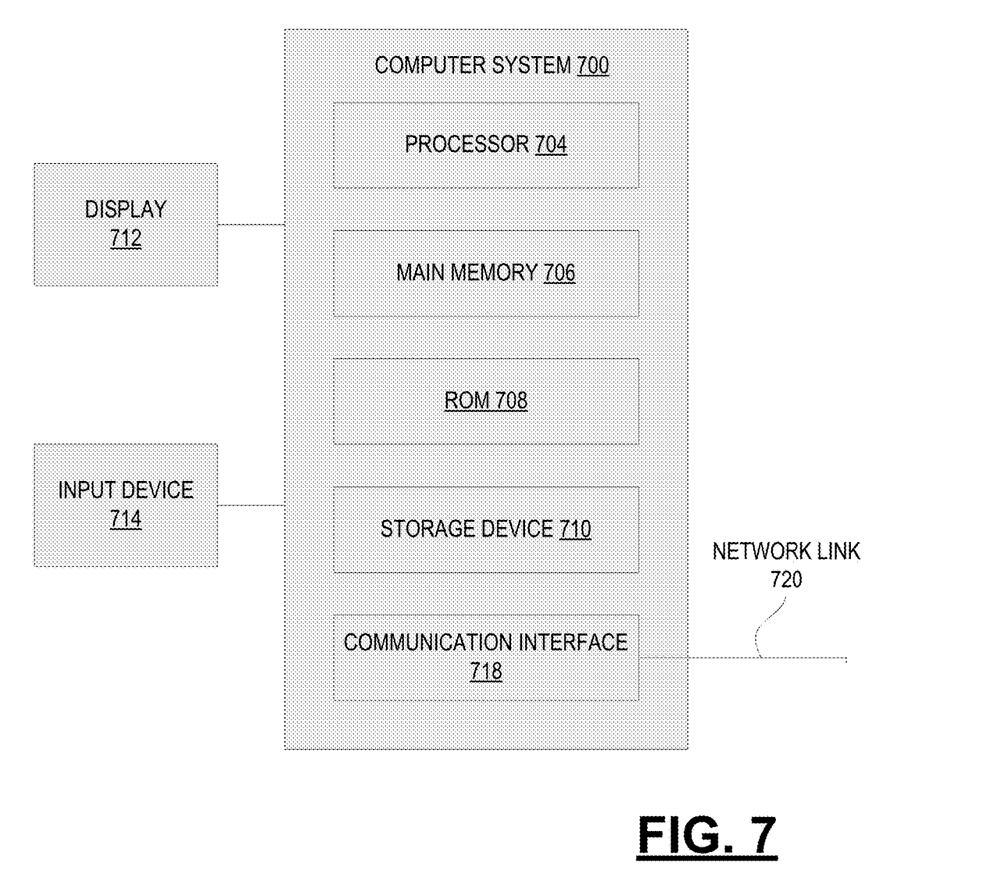
FIG. 7 is a block diagram that illustrates a computer system upon which embodiments described herein may be implemented.

In an embodiment, one or more of a user's computer and server(s) (for implementing system 100 of FIG. 1) may be implemented on or using a computer system. FIG. 7 is a block diagram that illustrates a computer system 700 upon which embodiments described herein may be implemented. In an embodiment, computer system 700 includes processor 704, main memory 706, ROM 708, storage device 710, and communication interface 718. Computer system 700 includes at least one processor 704 for processing information. Computer system 700 also includes a main memory 706, such as a random access memory (RAM) or other dynamic storage device, for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device for storing static information and instructions for processor 704. A storage device 710, such as a magnetic disk or optical disk, is provided for storing information and instructions.

Computer system 400 may be coupled to a display 712, such as a cathode ray tube (CRT), a LCD monitor, and a television set, for displaying information to a user. An input device 714, including alphanumeric and other keys, is coupled to computer system 700 for communicating information and command selections to processor 704. Other non-limiting, illustrative examples of input device 714 include a mouse, a trackball, or cursor direction keys for communicating direction information and command selections to processor 704 and for controlling cursor movement on display 712. While only one input device 714 is depicted in FIG. 7, embodiments may include any number of input devices 714 coupled to computer system 700.

Embodiments described herein are related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement embodiments described herein. Thus, embodiments described are not limited to any specific combination of hardware circuitry and software.

CONCLUSION

Although illustrative embodiments have been described in detail herein with reference to the accompanying drawings, it is to be understood that the embodiments described are not limited to specific examples recited. As such, many modifications and variations are possible, including the matching of features described with one embodiment to another embodiment that makes no reference to such feature. Moreover, a particular feature described either individually or as part of an embodiment can be combined with other individually described features, or parts of other embodiments, even if the other features and embodiments make no mention of the particular feature.

What is claimed is:

1. A computer-implemented method for displaying clothing or apparel, the method being implemented by one or more processors and comprising:

using one or more processors to perform steps comprising:
enabling a user to select a set of clothing or apparel and to layer a first item of clothing or apparel in the set relative to a second item of clothing or apparel in the set;
providing the first and second items of clothing or apparel to appear as being worn together on a representation of a body, including enabling one or more regions of the selected set of clothing or apparel to appear pinched based, at least in part, on (i) the layering of the first item relative to the second item, (ii) a distance between a boundary of the representation and a boundary of the first item of clothing or apparel, and (iii) a distance between the boundary of the representation and a boundary of the second item of clothing or apparel;
wherein enabling one or more regions of the selected set of clothing or apparel to appear pinched includes reducing one or more dimensions of the first or the second item of clothing.

2. The method of claim 1, wherein the set of clothing or apparel includes multiple items, and wherein enabling one or more select regions to appear pinched includes enabling a region of one of the items in the set as being pinched based on a position of the region of that item relative to another item of clothing or apparel in the set that is provided as being worn.

3. The method of claim 1, wherein enabling one or more select regions to appear pinched includes enabling a region of one of the items in the set as being pinched based on a position of that region of that item relative to a position of the representation of the body.

4. The method of claim 1, wherein providing the first and second items of clothing or apparel to appear as being worn together on the representation of the body includes superimposing one or more images depicting the selected set of clothing or apparel onto the representation of the body.

5. The method of claim 1, wherein enabling the user to select the set of clothing includes enabling the user to select one or more items of clothing based on a specified color, pattern or texture.

6. The method of claim 1, wherein enabling the user to select the set of clothing includes enabling the user to select one or more items of clothing by specifying a visual characteristic of an item of clothing or apparel.

7. The method of claim 1, wherein enabling the selected set of clothing or apparel to appear pinched includes identifying the first item of clothing or apparel in the set as an inner layer as compared to the second item of clothing or apparel, and then pinching and/or shading the first item of clothing based at least in part on a relative position of the second item of clothing or apparel to the first item of clothing or apparel.

8. The method of claim 1, wherein enabling the selected set of clothing or apparel to appear pinched includes identifying the first item of clothing or apparel in the set as an inner layer as compared to the second item of clothing or apparel, and then simulating the pinched region on the first item of clothing by removing a portion of an image depicting a region of the first clothing or apparel that extends beyond the boundary of the second item of clothing or apparel.

9. The method of claim 1, wherein simulating the pinched region on the first item of clothing includes altering pixels that depict the first item of clothing and which are beyond the boundary of the second item of clothing.

10. The method of claim 1, wherein enabling the selected set of clothing or apparel to appear pinched includes enabling multiple regions of the item of clothing or apparel to be pinched.

11. The method of claim 1, wherein enabling the selected set of clothing or apparel to appear pinched includes enabling multiple regions of the item of clothing or apparel to appear pinched and multiple regions of the item of clothing or apparel to appear shaded.

12. The method of claim 1, further comprising analyzing a collection of images that individually depict one or more items of clothing or apparel, and categorizing individual items of clothing or apparel depicted in the collection of images as to pinchability of the item of clothing.

13. The method of claim 12, wherein analyzing the collection of images includes performing image analysis on the individual images in the collection.

14. The method of claim 1, further comprising determining a region on the item of clothing or apparel that is to be shaded based on a relative position of the representation of the body on which the item of clothing or apparel is to be worn, then darkening the region to simulate shading.

15. The method of claim 1, wherein the representation corresponds to a model or a mannequin.

16. A system for displaying clothing or apparel, the system comprising:

one or more processors configured to:
enable a user to select a set of items of clothing or apparel and to layer a first item of clothing or apparel in the set relative to a second item of clothing or apparel in the set; and
provide the first and second items of clothing or apparel in a manner that represents how the first and second items of clothing or apparel appears when worn together on a representation of a body, by enabling one or more regions of the selected set of clothing or apparel to appear pinched based, at least in part, on (i) the layering of the first item relative to the second item, (ii) a distance between a boundary of the representation and of the first item of clothing or apparel, and (iii) a distance between the boundary of the representation and a boundary of the second item of clothing or apparel;
wherein enabling one or more regions of the selected set of clothing or apparel to appear pinched includes reducing one or more dimensions of the first or the second item of clothing.

17. The system of claim 16, wherein the one or more processors are configured to enable the first item in the selected set to include one or more regions that are pinched as a result of the presence of the representation of the body on which the first item is worn.

18. The system of claim 16, wherein the one or more processors are configured to blend the one or more pinched regions with unpinched regions.

19. The system of claim 16, wherein the one or more processors are configured to superimpose one or more images depicting the selected set of clothing or apparel onto the representation of the body.

20. The system of claim 16, wherein the one or more processors are configured to enable the selected set of clothing or apparel to appear pinched by identifying the first item of clothing or apparel in the set as an inner layer as compared to the second item of clothing or apparel, and then pinching and/or shading the first item of clothing based at least in part on a relative position of the second item of clothing or apparel to the first item of clothing or apparel.

21. The system of claim 16, wherein the one or more processors are configured to enable the selected set of clothing or apparel to appear pinched by identifying the first item of clothing or apparel in the set as an inner layer as compared to the second item of clothing or apparel, and then simulating the pinched region on the first item of clothing by removing a portion of an image depicting a region of the first clothing or apparel that extends beyond the boundary of the second item of clothing or apparel.

22. The system of claim 16, wherein the representation corresponds to a model or a mannequin.

* * * * *